(12) United States Patent
Kiser

(10) Patent No.: US 6,564,384 B1
(45) Date of Patent: May 20, 2003

(54) COMBINED HELMET AND COMPASS

(76) Inventor: Joseph D. Kiser, 8633 33$^{rd}$ Ave., Kenosha, WI (US) 53142-2557

(*) Notice: Subject to any disclaimer, the term of this patent is extended or adjusted under 35 U.S.C. 154(b) by 0 days.

(21) Appl. No.: 10/207,756

(22) Filed: Jul. 30, 2002

(51) Int. Cl.$^7$ ............................................. A42B 3/00
(52) U.S. Cl. ........................... 2/5; 2/205; 2/422; 2/427
(58) Field of Search ............................... 2/9, 5, 8, 901, 2/205, 202, 424, 427, 426, 7, 422; 128/206.12, 201.22, 207.11, 201.23, 201.25, 201.24; 33/355 R, 333, 354, 347

(56) References Cited

U.S. PATENT DOCUMENTS

| | | | |
|---|---|---|---|
| 1,409,808 A | * 3/1922 | Wood | 2/422 |
| 1,972,708 A | * 9/1934 | Hull | 33/364 |
| 1,994,998 A | * 3/1935 | Hull | 33/347 |
| 2,665,686 A | * 1/1954 | Wood et al. | 128/206.12 |
| 2,873,536 A | * 2/1959 | Rieger | 33/359 |
| 3,045,206 A | * 7/1962 | Ahrens et al. | 367/113 |
| 3,220,408 A | * 11/1965 | Silverberg | 128/206.23 |
| 3,435,556 A | 4/1969 | Clarke | |
| 3,550,588 A | * 12/1970 | Stahl | 128/201.15 |
| 3,653,086 A | * 4/1972 | Gongwer | 2/9 |
| 3,688,314 A | 9/1972 | Hill | |
| 3,712,714 A | * 1/1973 | Uyeda et al. | 359/857 |
| 4,776,045 A | * 10/1988 | Mysliwiec et al. | 2/426 |
| D301,644 S | 6/1989 | Sestak | |
| 4,953,304 A | * 9/1990 | Raitmaa et al. | 33/355 R |
| 4,972,520 A | 11/1990 | Grilliot et al. | |
| 5,001,786 A | * 3/1991 | Copeland | 2/424 |
| 5,162,828 A | * 11/1992 | Furness et al. | 353/122 |
| 5,187,871 A | * 2/1993 | McDermott | 33/354 |
| 5,301,668 A | * 4/1994 | Hales | 2/428 |
| 5,386,592 A | 2/1995 | Ckeckeroski | |
| 5,438,494 A | 8/1995 | Harlan | |
| 5,561,855 A | 10/1996 | McFall | |
| 5,585,871 A | * 12/1996 | Linden | 351/158 |
| D392,629 S | 3/1998 | Amafuji et al. | |

FOREIGN PATENT DOCUMENTS

| | | | | |
|---|---|---|---|---|
| EP | 164946 A2 | * 12/1985 | | A62B/7/00 |
| FR | 2549730 A1 | * 2/1985 | | A62B/18/08 |
| GB | 2273054 A | * 6/1994 | | A62B/18/08 |
| JP | 05264277 A | * 10/1993 | | G01C/17/04 |

* cited by examiner

*Primary Examiner*—Rodney M. Lindsey
(74) *Attorney, Agent, or Firm*—Donald R. Schoonover

(57) ABSTRACT

A helmet, such as used by firefighters, includes a compass mounted on the inside of the helmet in a location that will be easily visible to the wearer when necessary but will be positioned so it will not distract the wearer at other times.

3 Claims, 1 Drawing Sheet

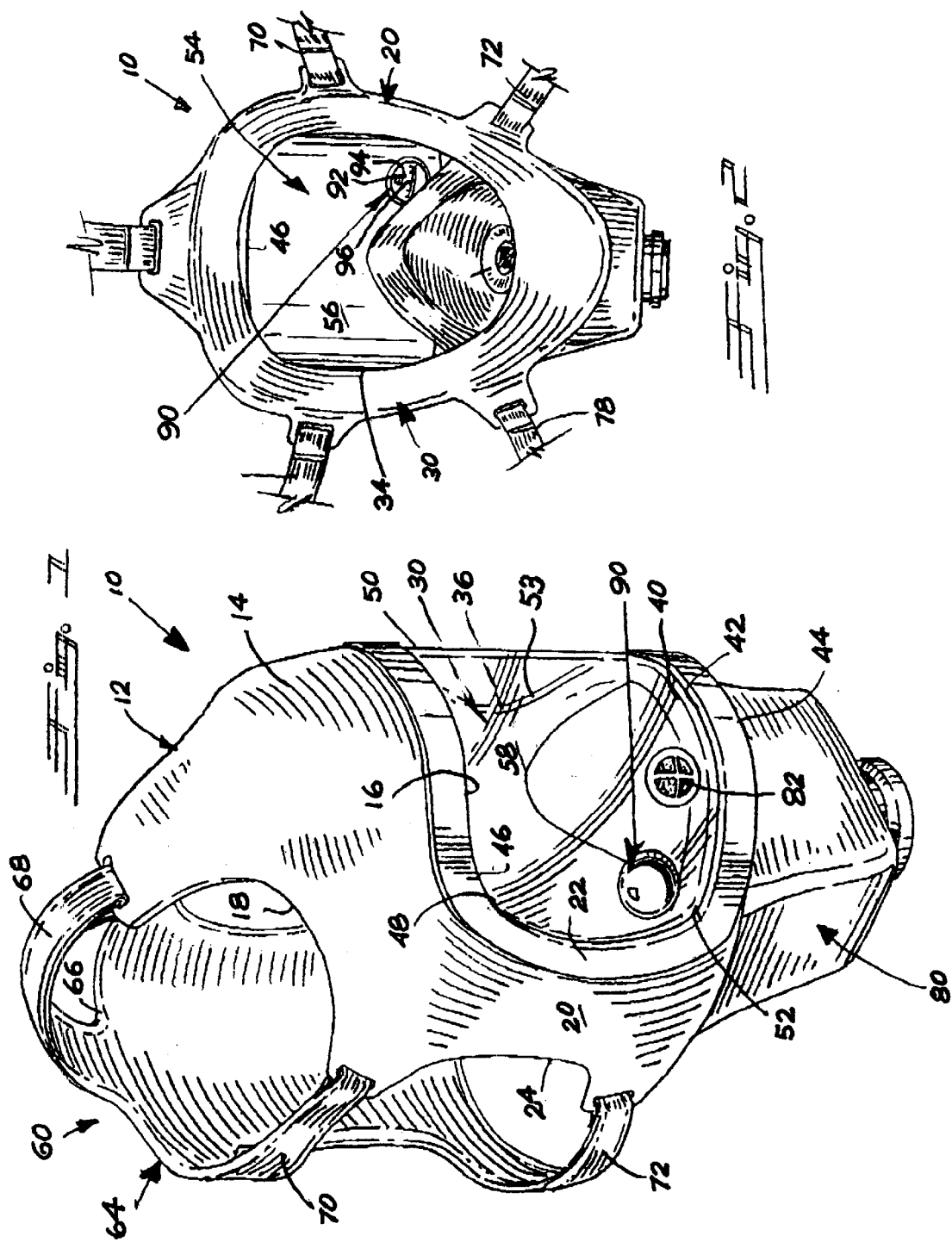

COMBINED HELMET AND COMPASS

BACKGROUND OF THE INVENTION

1. Field of the Invention

The present invention relates to the general art of headgear, and to the particular field of helmets.

2. Discussion of the Related Art

Many fires require firemen to enter a burning building. Many modern fires generate a great deal of smoke and vision-impairing debris due to the materials found in many buildings. As is well known, smoke inhalation is just as dangerous, if not more so, than the other dangers associated with fires. Accordingly, most, if not all, firefighters wear helmets and other forms of headgear when entering a building during a fire emergency.

While the helmets are indispensable and life-preserving, they sometimes may hinder the wearer in some respects. A helmet may reduce the wearer's vision somewhat, if for no other reason than the wearer's peripheral vision may be reduced or impaired by the helmet. Even if the helmet has a large face-covering portion, most people have a peripheral vision capability that will be reduced or impaired by even large face-covering portions. Thus, for example, if visibility is reduced due to smoke or the like, the wearer will want as much of his or her vision capability as possible and their peripheral vision will certainly help the wearer orient himself or herself. Any reduction in the peripheral vision by a helmet may not be desirable if the wearer must orient himself or herself in a very low-visibility environment. Often, a building that is being entered by firefighters has the electricity cut off and may not have any means for providing artificial light. This lack of artificial light exacerbates the visibility reduction already caused by smoke and the like.

Therefore, there is a need for a fireman's helmet that will enhance the safety of the wearer.

More specifically, when visibility is severely reduced or nearly eliminated by smoke or the like, the firefighter may become disoriented and lose his or her way. This may cause the firefighter to move in the wrong direction, which may be extremely dangerous. However, without clear visibility, this situation is very likely, especially when the firefighter may be concentrating on things other than his or her direction of movement or orientation. This situation is exacerbated if the firefighter's helmet reduces their ability to visually orient themselves.

Therefore, there is a need for a fireman's helmet that will permit the wearer to orient himself or herself even in vision-impairing environmental conditions.

More specifically, there is a need for a fireman's helmet that will permit the wearer to determine directions even if visibility is reduced or eliminated by environmental conditions.

However, in order to provide directional information to a helmet wearer, the information must be provided in a manner that will not interfere with the wearer's vision or distract them in any way. Distraction or vision interference may be more than merely undesirable, especially in extremely dangerous situations. However, directional information is very important, and thus a balance must be made regarding the provision of directional information and the provision of such information in a manner that may distract the helmet wearer or even impair his or her vision.

Therefore, there is a need for a fireman's helmet that can provide direction to the wearer even if the wearer's vision is impaired by environmental conditions but will not interfere with the wearer's concentration or vision.

PRINCIPAL OBJECTS OF THE INVENTION

It is a main object of the present invention to provide a fireman's helmet that will enhance the safety of the wearer.

It is another object of the present invention to provide a fireman's helmet that can provide direction to the wearer even if the wearer's vision is impaired by environmental conditions.

It is another object of the present invention to provide a fireman's helmet that can provide direction to the wearer even if the wearer's vision is impaired by environmental conditions but will not distract the wearer.

It is another object of the present invention to provide a fireman's helmet that can provide direction to the wearer even if the wearer's vision is impaired by environmental conditions but will not interfere with the wearer's concentration or vision.

SUMMARY OF THE INVENTION

These, and other, objects are achieved by a fireman's helmet that includes a compass mounted inside the helmet. The compass is located where the wearer can easily see the compass when necessary but is located where it will not interfere with the wearer's vision or distract the wearer and the wearer must exercise a conscious effort to view the compass. In this manner, the compass will be readily visible to the wearer when desired, but will not be located to interfere with the wearer's vision and will be located so the wearer must exercise a conscious effort to view the compass. Thus, the compass will not distract the wearer.

BRIEF DESCRIPTION OF THE DRAWING FIGURES

FIG. 1 is a front perspective view of a fireman's helmet that includes a compass located to provide direction information without distracting the wearer.

FIG. 2 is a rear perspective view of the fireman's helmet embodying the present invention.

DETAILED DESCRIPTION OF THE INVENTION

Other objects, features and advantages of the invention will become apparent from a consideration of the following detailed description and the accompanying drawings.

Referring to the accompanying FIGS. 1 and 2, it can be understood that the present invention is embodied in a fireman's helmet 10 which comprises a head covering section 12 which includes a forehead cover 14 which covers a wearer's forehead above the wearer's eyes when the head covering section 12 is worn, and which extends between the wearer's right temple section and the wearer's left temple section. The forehead cover 14 is formed of opaque material and has an inside edge 16 and an outside edge 18, with the inside edge 16 being located adjacent to the wearer's eyes. The head covering section 12 further includes a right-cheek cover 20 which when the head covering section 12 is worn, covers a right cheek section of the wearer's face and which extends from the wearer's right temple section to near the chin area of the wearer. The right-cheek cover 20 is formed of opaque material and has an inside edge 22 and an outside edge 24 with the inside edge 22 of the right-cheek cover 20 being located adjacent to the wearer's face. The head covering section 12 further includes a left-cheek cover 30 which, when the head covering section is worn, covers a left cheek section of the wearer's face and which extends from the wearer's left temple section to near the chin area of the wearer. The left-cheek cover 30 is formed of opaque material and has an inside edge 36 and an outside edge 34 with the inside edge 36 of the left-cheek cover 30 being located adjacent to the wearer's face on the side of the wearer's face and opposite to the right-cheek 20 such that the wearer's face is located between the right-cheek cover 20 and the left-cheek cover 30 and adjacent to the forehead cover 14 when the head covering section 12 is worn.

A chin cover 40 is located adjacent to the chin area of a wearer between the wearer's mouth area and the neck area of the wearer when the head covering section 12 is worn. The chin cover 40 is formed of opaque material and has an inside edge 42 located adjacent to the wearer's mouth and an outside area 44 located near the neck section of the wearer.

The inside edges of the forehead cover 14, the right-cheek cover 20, the left-cheek cover 30, and the chin cover 40 intersect each other and define a continuous inner periphery 46 surrounding the face area of a wearer when the head covering section 12 is worn. A top right corner 48 is defined at the intersection of the inside edges of the forehead cover 14 and the right-cheek cover 20, a top left corner 50 is defined at the intersection of the inside edges of the forehead cover 14 and the left-cheek cover 30, a bottom right corner 52 is defined at the intersection of the inside edges of the right-cheek cover 20 and the chin cover 40, and a bottom left corner 53 is defined at the intersection of the inside edges of the left-cheek cover 30 and the chin cover 40.

The head covering section further 12 includes a face shield 54 is mounted on the inside edges of the forehead cover 14, the right-cheek cover 20, the left-cheek cover 30 and the chin cover 40. The face shield 54 is formed of transparent material which is impervious to smoke and air and has an inside surface 56 located near the wearer's face and an outside surface 58 which is exposed to the environment when the head covering section 12 is worn.

The head covering section 12 further includes a strap system 60 that secures the head covering section 12 to the wearer. Strap system 60 includes a rear head support 64 that abuts the rear of a wearer's head when the head covering section 12 is worn and which includes an outer peripheral edge 66. The strap system 60 further includes a top strap 68 which connects the outside edge 18 of the forehead cover 14 to the outer peripheral edge 66 of the rear head support 64, a top right strap 70 located near the forehead cover 14 and which connects the outside edge 24 of the right-cheek cover 20 to the outer peripheral edge 66 of the rear head support 64, a bottom right strap 72 located near the chin cover 40 and which connects the outside edge 24 of the right-cheek cover 20 to the outer peripheral edge 66 of the rear head support 64, a top left strap 76 located near the forehead cover 14 and which connects the left-cheek cover 30 to the outer peripheral edge 66 of the rear head support 64, and a bottom left strap 78 located near the chin cover 40 and which connects the left-cheek cover 30 to the outer peripheral edge 66 of the rear head support 64.

An air filter unit 80 is attached to the chin section 40 and to the right-cheek cover 20 and to the left-cheek cover 30 and includes an air vent 82 located in the chin section 40 and which is in fluid communication with the wearer when the head covering section 12 is worn to locate inhalable air adjacent to the wearer's face and to remove exhaled air from adjacent the wearer's face. The air filter unit 80 includes an air filter system that is usual to such helmets and filters air entering and leaving the head covering section 12.

The helmet 10 of the present invention includes a directional magnetic compass 90 mounted on the inside surface 56 of the face shield 54 adjacent to the bottom right corner 52. The compass includes a face 92 having direction indicators 94 thereon and a compass pointer 96. Compass 90 is located to be visible to a wearer when the wearer looks down and to the right but will not be visible when the wearer looks directly ahead. In this manner, the compass 90 will be visible when desired but will not distract the wearer at other times. Therefore, when a wearer needs directions, he or she can simply look down at the compass 90 by making a conscious effort to look at the compass 90. By locating the compass 90 in a position that requires a conscious effort to view it, the compass 90 will be available to the wearer when he or she needs it, but will not distract the wearer at other times.

It is understood that while certain forms of the present invention have been illustrated and described herein, it is not to be limited to the specific forms or arrangements of parts described and shown.

I claim:
1. A fireman's helmet comprising:
a) a head covering section which includes
   (1) a forehead cover which when said head covering section is worn covers a wearer's forehead above the wearer's eyes and which extends between the wearer's right temple section and the wearer's left temple section, the forehead cover being formed of opaque material and having an inside edge and an outside edge, with the inside edge being located adjacent to the wearer's eyes,
   (2) a right-cheek cover which when said head covering section is worn covers a right cheek section of the wearer's face and which extends from the wearer's right temple section to near the chin area of the wearer, the right-cheek cover being formed of opaque material and having an inside edge and an outside edge with the inside edge of the right-cheek cover being located adjacent to the wearer's face,
   (3) a left-cheek cover which when said head covering section is worn covers a left cheek section of the wearer's face and which extends from the wearer's left temple section to near the chin area of the wearer, the left-cheek cover being formed of opaque material and having an inside edge and an outside edge with the inside edge of the left-cheek cover being located adjacent to the wearer's face on the side of the wearer's face located opposite to the right-cheek cover whereby the wearer's face is located between the right-cheek cover and the left-cheek cover and adjacent to the forehead cover,
   (4) a chin cover which when said head covering section is worn covers the chin area of a wearer between the wearer's mouth area and the neck area of the wearer, the chin cover being formed of opaque material and having an inside edge located adjacent to the wearer's mouth and an outside area located near the neck section of the wearer,
   (5) the inside edges of the forehead cover, the right-cheek cover, the left-cheek cover, and the chin cover intersecting each other and defining
      (A) a continuous inner periphery surrounding the face area of a wearer when said head covering section is worn,
      (B) a top right corner at the intersection of the inside edges of the forehead cover and the right-cheek cover,

(C) a top left corner at the intersection of the inside edges of the forehead cover and the left-cheek cover, (D) a bottom right corner at the intersection of the inside edges of the right-cheek cover and the chin cover, and (E) a bottom left corner at the intersection of the inside edges of the left-cheek cover and the chin cover, (6) a face shield mounted on the inside edges of the forehead cover, the right-cheek cover, the left-cheek cover and the chin cover, the face shield being formed of translucent material which is impervious to smoke and air and having an inside surface located near the wearer's face and an outside surface, (7) a strap system that secures said head covering section to the wearer and which includes (A) a rear head support that abuts the rear of a wearer's head when said head covering section is worn and which includes an outer peripheral edge, (B) a top strap which connects the outside edge of the forehead cover to the outer peripheral edge of the rear head support, (C) a top right strap located near the forehead cover and which connects the outside edge of the right-cheek cover to the outer peripheral edge of the rear head support, (D) a bottom right strap located near the chin cover and which connects the outside edge of the right-cheek cover to the outer peripheral edge of the rear head support, (E) a top left strap located near the forehead cover and which connects the left-cheek cover to the outer peripheral edge of the rear head support, and (F) a bottom left strap located near the chin cover and which connects the left-cheek cover to the outer peripheral edge of the rear head support, and (8) an air filter unit attached to the chin cover and to the right-cheek cover and to the left-cheek cover and including an air vent located in the chin cover and which is in fluid communication with the wearer when said head covering section is worn to locate inhalable air adjacent to the wearer's face and to remove exhaled air from adjacent the wearer's face, and an air filtering system that filters air entering and leaving said head covering section; and b) a directional magnetic compass mounted on the inside surface of the face shield adjacent to the bottom right corner, said compass including a face having direction indicators thereon and a compass pointer.

2. A fireman's helmet comprising:

a) a head covering section which covers a wearer's head when worn;

b) a face shield mounted on said head covering section and which covers a wearer's face when said head covering section is worn and which is air impervious and which includes an inner surface located adjacent to the wearer's face and a lower portion positioned near a wearer's chin when said head covering is worn; and c) a directional compass mounted on the inside surface of said face shield near the lower portion of said face shield.

3. The fireman's helmet as described in claim 2 wherein said directional compass is a magnetic compass.

\* \* \* \* \*